J. R. McPHERSON.
Stock-Car.
No. 168,043.　　　　　　　Patented Sept. 21, 1875.
FIG. I
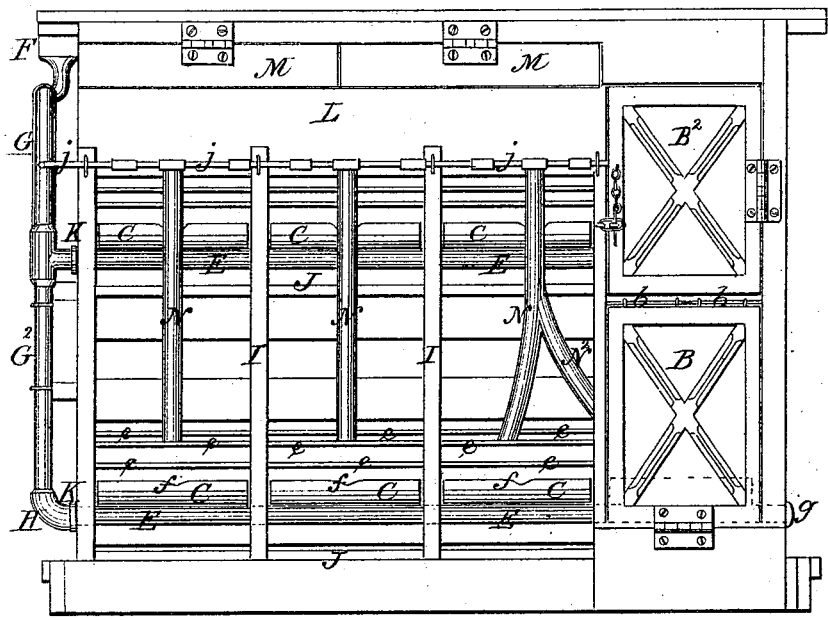
FIG. II
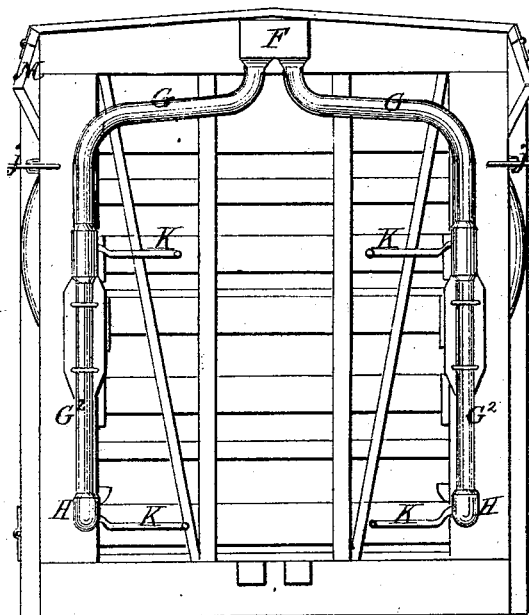
FIG. III
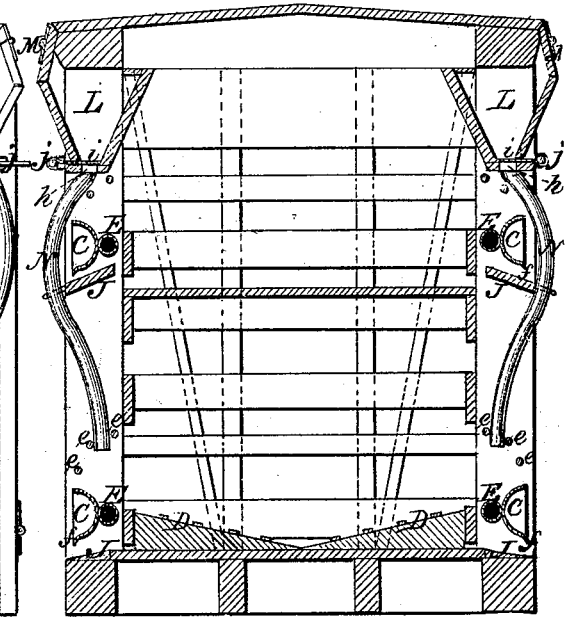
WITNESSES
John E. Laing.
J. H. Rutherford
INVENTOR
John R. McPherson
By Johnson & Johnson
his Attys.

3 Sheets--Sheet 2.
J. R. McPHERSON.
Stock-Car.
No. 168,043. Patented Sept. 21, 1875.
FIG IV
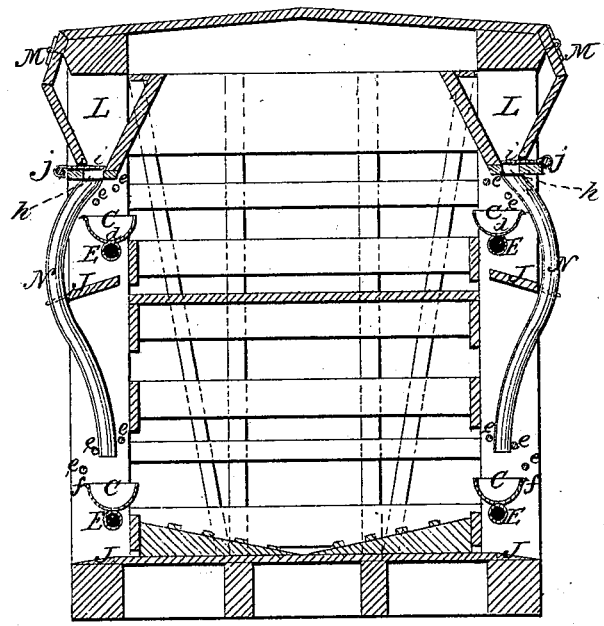
FIG V
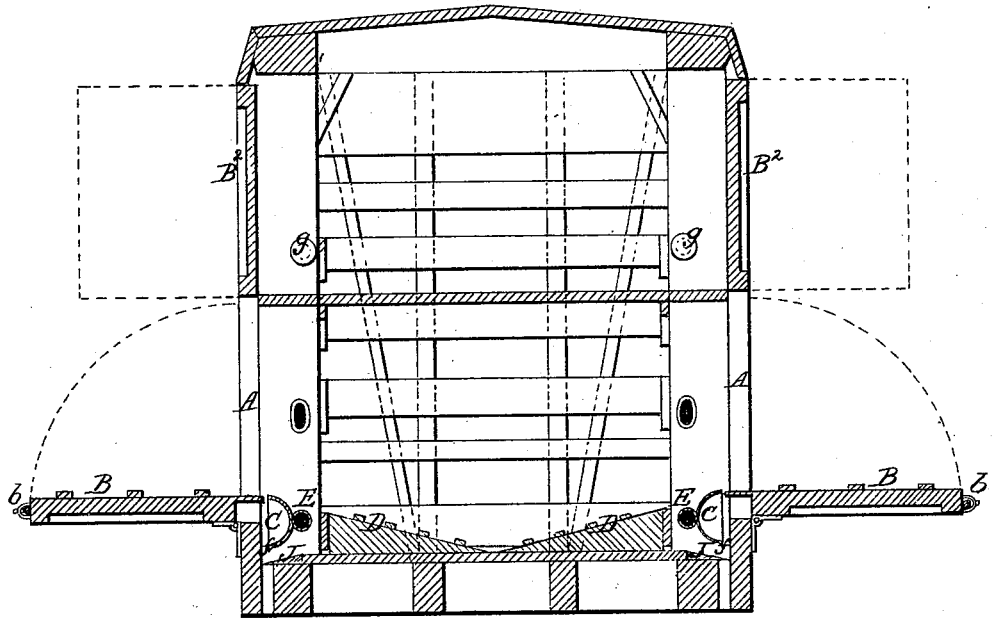
WITNESSES
John E. Laing.
J. H. Rutherford
INVENTOR
John R. McPherson
By Johnson and Johnson
his Attys J. R. McPHERSON.
Stock-Car.
No. 168,043. Patented Sept. 21, 1875.
3 Sheets--Sheet 3.
FIG VI
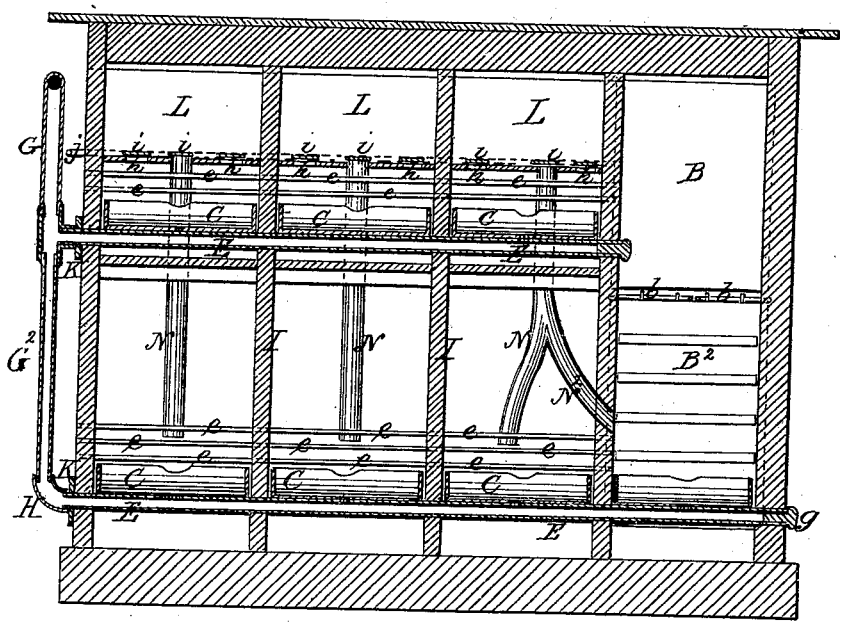
FIG VII
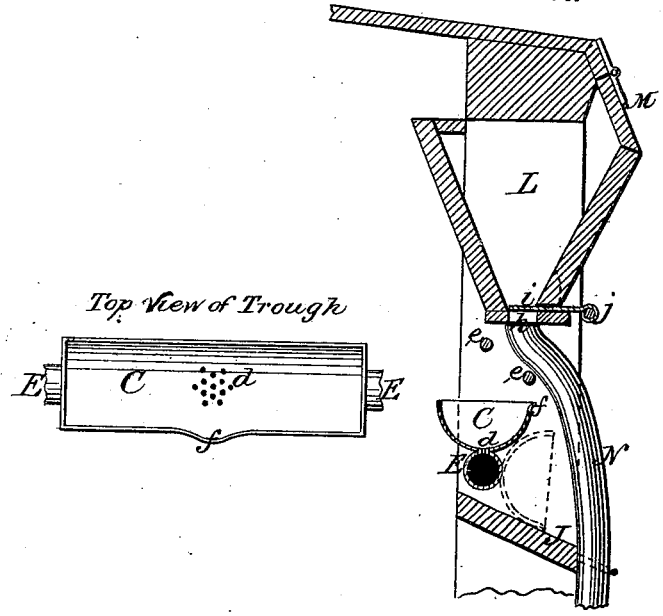
Top View of Trough
FIG VIII
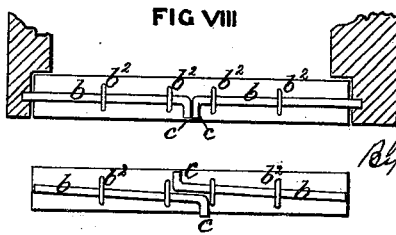
WITNESSES
John E. Laing.
J. H. Rutherford
INVENTOR
John R. McPherson
By Johnson and Johnson
his Attys

UNITED STATES PATENT OFFICE.

JOHN R. McPHERSON, OF JERSEY CITY, NEW JERSEY.

IMPROVEMENT IN STOCK-CARS.

Specification forming part of Letters Patent No. 168,043, dated September 21, 1875; application filed May 21, 1875.

*To all whom it may concern:*

Be it known that I, JOHN R. McPHERSON, of Jersey City, in the county of Hudson and State of New Jersey, have invented certain new and useful Improvements in Stock-Cars; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The transportation of live stock in cars, having facilities for feeding and watering the same *in transitu*, and without unloading for that purpose, has received much attention, and improvements have been made to adapt cars for supplying both food and water, and otherwise ameliorating the condition of the dumb brute while *in transitu*.

The troughs are carried by a continuous pipe, by which they are not only supplied with water, but turned in positions for the animals to drink, and afterward turned down to empty their contents and that of the supply-conduits.

The turning-conduits are connected with and supplied by fixed branch pipes from a top tank at the end of the car. These water and feed troughs can be arranged for double-floored cars for small stock, and when so employed the branch pipes connecting the upper and lower troughs on each side of the cars must be so constructed as to effect a uniform distribution of the water in all the troughs or basins from the reservoir above.

The sectional troughs extend throughout the length of the car at the bottom, and are combined with platforms at the doorways to facilitate ingress and egress for the stock over the troughs, and in which the door forms the outer section of such platform.

The conduits are provided at their ends opposite their supply-connections with a valve or plug, whereby they can be opened, when desired, and cleaned out by hydraulic force from the head of water in the reservoir, whereby any foreign substance that might obstruct the passage of the water throughout the supply-conduit is carried out by the same force by which the troughs are supplied.

Fender-bars are combined with side openings in the cars and the rotatable troughs, whereby, while affording light and ventilation, they prevent the escape of small stock, keep them from getting into the troughs, and yet allow them to drink without hinderance.

In the accompanying drawings, Figure 1, Sheet 1, represents a side elevation of a stock-car embracing my invention; Fig. 2, same sheet, an end elevation of the same; Fig. 3, same sheet, a cross-section, showing the troughs and their supply-conduits turned outward to empty their contents; Fig. 4, Sheet 2, a similar section, with the troughs turned in position to feed the stock; Fig. 5, same sheet, a similar section taken through the platform-doors of the car; Fig. 6, Sheet 3, a longitudinal section taken vertically through the supply-bins and the feed-troughs within one of the side walls of the car; Fig. 7, same sheet, an enlarged vertical section through one of the supply-bins and the upper-deck feed-trough; and Fig. 8, same sheet, a horizontal section just above the platform-door, showing the manner of locking the door-bolts.

The body and trucks of the car may be of any approved construction and proportions suitable for the transportion of live stock, and with single or double decks. The doorways A A are provided in the sides at one end of each car, and in double-deck cars the doors B B² are made sectional, the lower sections B whereof are hinged at their lower ends, so as to open downward, and serve as platforms for the stock to pass over the feed-troughs into the car, as shown in Fig. 5, and are provided with surface-cleats for that purpose, while the upper sections B² are hinged at one side, so as to be opened and closed horizontally on a line with the lower sections. By this construction the lower deck may be filled, and its platform-door B turned up and closed, as in Fig. 1, and the upper deck filled by elevated platforms, and closed and fastened by a hasp and bolt.

The devices for securing the platform-door B are peculiar, and consist of two long bolts, $b$ $b$, secured in eyes $b^2$ $b^2$, Fig. 8, upon the free-end edge of the door, and having their inner ends bent at right angles to form handles $c$ $c$, by which to bolt them into the side posts of the car. When the door is closed and bolted these handles $c$ $c$ are turned down outward, so as to lie upon the edge of the door, and abut against each other, as shown in Fig. 8, so that they cannot work out of their bolted positions by the motion of the car, while the lower edge of the upper door closing over them effectually prevents the handles from being turned up, and thus secures the bolts against being unfastened by accident or otherwise so long as the upper door remains closed. The eyes $c$ $c$ allow the bolts sufficient play sidewise to pass each other to push or draw them.

The feed-troughs C of the lower deck extend the entire length of the car, crossing the doorways A on a level, or nearly so, when turned down with the platform-doors when the latter are also turned down, as shown in Fig. 5, so that the stock can easily pass over said troughs, inner cleated platforms D D being arranged to form a continuation of the door-platforms. By this means I gain the advantage of the full length of the car for the lower feed-troughs. The upper feed-troughs, however, do not cross the doorways, as no platforms can be conveniently provided for the purpose and afford sufficient headway.

These troughs or basins C are arranged in the walls of the car, and are of such size and form as will best economize space and facilitate the objects for which they are used. They are arranged to occupy the space between the frame-posts I, and, when not in use and turned outwardly, they will not occupy any part of the interior space of the car, and very little, if any, of such space when turned up to feed and water the stock. For this purpose they are made in sections, and each section is arranged in the same line, and so as to be turned up and down between the vertical timbers of the car-walls. They are fixed upon and carried by pipes E E, supported in bearings in the side posts, and the troughs are turned by these pipes into positions to feed and water the stock. These pipes, while serving to operate the troughs, serve also as the means whereby the troughs are supplied with water. They are about two or three inches in diameter, and the troughs or basins are bolted or otherwise secured thereon, and communicate therewith by small openings or perforations, through which the water rises from the conduits into the troughs or basins. Each section of the trough or basin is provided with a perforated shield, $d$, to prevent the corn from passing into the conduits. These pipes or conduits connect with a supply-reservoir, F, arranged under the roof, and at one end of the car, by means of branch connections G $G^2$ from both sides of the reservoir F outside of the car, the coupling-joints H of the branch pipes with the conduits being made by screwing the end of the conduit into a coupling on the lower end of the branch pipe, and provided with stuffing-boxes to prevent leaking, or in any suitable manner that will allow the conduits to be rotated with the troughs without interrupting the connection of the conduits with the supply-reservoir.

To obtain a uniform supply of water to the upper and lower conduits, that portion G of the branch pipes between the reservoir and the upper conduit is of greater diameter than that portion $G^2$ between the troughs, thus securing a uniform circulation through all the conduits, and an equal supply in the troughs or basins.

The supply may be let on and shut off by means of gates in the reservoir or cocks in the branch pipes. The side walls of the car are open along the line of and just above the feed-troughs, to give light and ventilation and allow the troughs to be turned up and down. These wall-openings are provided with fender-bars $e$, arranged to form guards to prevent the escape of the stock, and also prevent them from getting into the troughs by forming a kind of lattice hood over the troughs, which allow the stock to drink without hinderance when the troughs are turned up, but, by reason of curving over them, form only headway to the troughs, so that hogs cannot get therein. The sectional troughs, besides being cheaper to make than a continuous trough, are much lighter and more easily operated than a continuous trough. A trough of short sections has every advantage, as they can be placed between the wall-posts I and carried and turned by a small continuous pipe, E, by which each separate trough is supplied with water. Each trough has a mouth or spout, $f$, by which any overflow will be discharged outward upon water-sheds J while the stock are drinking, and they are turned down and outward to discharge any water or other substance remaining in the troughs outside of the car, to prevent freezing and preserve cleanliness.

The communicating openings of the conduits with the troughs are arranged so that when the troughs are turned down the water therein will run out freely, and thereby empty the supply-conduits at the same time, and by the same movement by which the troughs are emptied, and thereby keep the watering devices empty when the communication with the reservoir is cut off.

The feed-troughs are rotated by means of levers K secured to the conduits inside of the branch-pipe coupling, whereby the troughs are brought into positions by a positive force for the stock to drink or to empty their contents, such positive force being necessary to control the same against the pressure or impingement of animals; and the positions of the troughs or basins, both when in and out of use, are secured by suitable stops or rests on the end of the car, which hold the lever.

The ends of the conduits opposite their supply-branches are provided with valves or plugs $g$, which may be opened for the purpose of forcing out any foreign substances that might collect within and obstruct the free passage of the water through the conduits. This is effected by hydraulic pressure derived from the same head which supplies the troughs.

In a former patent I employed a feed crib or box for hay or fodder. In my present improvements I combine corn or grain bins with the troughs, whereby the stock is both fed and watered from the same troughs. This I accomplish by a series of closed bins, L, arranged along under the roof at each side of the car, and built mostly within the frame between the posts, and in the form of a series of hoppers. They extend sufficiently far outside of the car to be provided with a cover or covers, M, which may be hinged or slide, by which to fill the bins with corn or other grain.

As it is necessary to carry a sufficient quantity of grain for several days' use, and as a portion must be fed each day and distributed into the troughs or basins, equally and as nearly simultaneously as possible, I make a series of openings, $h$, in the bottoms of the bins, and employ in connection therewith a slide, $i$, or other equivalent device, for opening and closing said openings, by pulling out and pushing in a rod, $j$, connecting the slides. This slide-rod may be operated by a lever or handle in any suitable way that will control the quantity discharged through the bottom openings. The slide-rod is supported in guides in any suitable manner.

The grain drops from the bin-openings, when opened, directly into the upper troughs all along their length, and the lower troughs are supplied by pipes N extending from the bin-openings in positions between the fender-bars and just above the troughs, so that, in double-deck cars, the upper and lower troughs are supplied very nearly at the same time and from the same bins with small grain, and thereby utilize the drinking-troughs for receiving and holding such feed as can be supplied by its gravity to the stock.

The section of the trough crossing the doorway is supplied with the feed from the bins by a branch pipe, $N^2$, from the conductors N passing through an opening in the door-post, as shown in Fig. 6.

These grain-conducting devices are secured in any suitable manner, and formed so as not to interfere with the functions of the upper troughs, their purpose being to receive and transfer the grain into the troughs.

It is obvious that the invention herein described is equally applicable for single-deck cars for the transportation of cattle and horses, and that the troughs or basins will be located as required for such adaptation.

The following is claimed as new in stock-cars, namely:

1. A feed and water trough for stock-cars, combined with the pipe or conduit which supplies its water, and arranged to be turned into position for feeding the stock, and out of such position for emptying the contents of such trough, by the same pipe or conduit, essentially as herein set forth.

2. In combination with a stock-car, a rotatable feed and water trough and the conduit by which it is supplied with water, crossing the doorways, and presenting, when turned down to empty their contents, the solid sides of said trough and its conduit, for the passage thereover of the stock in loading and unloading the car, substantially as set forth.

3. The combination, in a stock-car in which the feed and water troughs cross the doorways thereof, of hinged platforms B and interior platforms D, both forming a junction with the feed and water trough and a continuous platform therewith, for loading and unloading stock over said feed and water trough.

4. The combination, in a stock-car having rotatable feed and water troughs turned into and out of positions by the conduits E, by which they are supplied with water, of fixed pipes $G$ $G^2$, connecting with said conduits and the elevated reservoir F, whereby the movable trough-conduits form extensions or continuations of supply-pipes fixed upon the end of the car.

5. The troughs of a stock-car, provided with overflow mouths or spouts $f$, in combination with the conduits E, which carry and supply said troughs, and the water-sheds J, whereby any overflow will pass off outside of the car while the stock are drinking.

6. The combination, with a rotatable trough of a stock-car, of the fender-bars $e$ extending longitudinally in the wall-openings and having the relation with the troughs, substantially as and for the purpose herein set forth.

7. The combination, with feed and water troughs adapted for double-deck cars, of branch pipes $G$ $G^2$, connecting the supplying conduits of said troughs with the reservoir F above, whereby both the upper and lower troughs are supplied by the same pipe.

8. The combination, with feed and water troughs adapted for double-deck cars, of branch pipes $G$ $G^2$, connecting the upper and lower trough-conduits E with sections of different diameters, whereby a uniform circulation through all the conduits and an equal water-supply in the troughs or basins are obtained.

9. The combination, with the sectional doors B $B^2$ in a stock-car, of the bolts $b$ $b$, provided with right-angled ends $c$ $c$ and confining-eyes $b^2$, occupying positions on the upper edge of the lower door when closed and held in their fastened positions by the upper door closing over the abutting ends $c\ c$ of said bolts, as herein set forth.

10. The combination, with the trough-section crossing the doorway, of the branch pipes $N\ N^2$ and the elevated wall-bin, whereby the said trough is supplied with feed without obstructing the doorway.

In testimony that I claim the foregoing as my own I have affixed my signature in presence of two witnesses.

JOHN R. McPHERSON.

Witnesses:
  A. E. H. JOHNSON,
  J. W. HAMILTON JOHNSON.